United States Patent
Cummings et al.

(10) Patent No.: US 7,854,199 B2
(45) Date of Patent: *Dec. 21, 2010

(54) PRINTING PLATE REGISTRATION USING A CAMERA

(75) Inventors: Calvin D. Cummings, Surrey (CA); Allan Warnes, North Vancouver (CA); Peter Hawes, Burnaby (CA)

(73) Assignee: Eastman Kodak Company, Rochester, NY (US)

(*) Notice: Subject to any disclaimer, the term of this patent is extended or adjusted under 35 U.S.C. 154(b) by 625 days.

This patent is subject to a terminal disclaimer.

(21) Appl. No.: 11/693,007

(22) Filed: Mar. 29, 2007

(65) Prior Publication Data

US 2008/0236426 A1   Oct. 2, 2008

(51) Int. Cl.
H01L 27/00 (2006.01)
H04N 1/08 (2006.01)

(52) U.S. Cl. ............... 101/463.1; 101/477; 250/208.1; 250/559.3

(58) Field of Classification Search ......... 101/463.1, 101/401.1, 477; 250/208.1, 559.3
See application file for complete search history.

(56) References Cited

U.S. PATENT DOCUMENTS

| | | | | |
|---|---|---|---|---|
| 4,553,478 | A | * | 11/1985 | Greiner et al. ............ 101/484 |
| 4,876,456 | A | | 10/1989 | Isono et al. |
| 4,881,086 | A | | 11/1989 | Misawa |
| 5,992,325 | A | | 11/1999 | Schumann et al. |
| 6,318,262 | B1 | | 11/2001 | Wolber et al. |
| 6,321,651 | B1 | | 11/2001 | Tice et al. |
| 6,815,702 | B2 | | 11/2004 | Kiermeier et al. |
| 6,915,743 | B2 | | 7/2005 | Blohdorn et al. |
| 6,968,782 | B2 | * | 11/2005 | Cummings ............ 101/401.1 |
| 7,063,018 | B2 | | 6/2006 | Smythies et al. |
| 2002/0181021 | A1 | | 12/2002 | Stephens |
| 2004/0139403 | A1 | | 7/2004 | Yakubov et al. |
| 2004/0159780 | A1 | | 8/2004 | Fischer et al. |
| 2005/0062780 | A1 | | 3/2005 | Chee |
| 2005/0155419 | A1 | | 7/2005 | Naruoka |
| 2006/0005728 | A1 | * | 1/2006 | Neufeld et al. ............ 101/485 |

FOREIGN PATENT DOCUMENTS

| | | |
|---|---|---|
| EP | 1 081 458 A2 | 3/2001 |
| EP | 1 270 222 A | 1/2003 |
| WO | WO 2007/019677 A | 2/2007 |

* cited by examiner

*Primary Examiner*—Ren Yan
*Assistant Examiner*—Shema T Freeman
(74) *Attorney, Agent, or Firm*—Nelson Adrian Blish

(57) ABSTRACT

A method and apparatus for determining the alignment of printing plate (14) mounted on an imaging drum (12), and applying an image to a printing plate while maintaining registration and alignment between the image and a reference edge (15) of the printing plate include mounting the printing plate on a plate-making machine (10) and then determining the locations of at least two points on the reference edge. The locations of two or more points are used to determine a transformation that is applied to image data to yield transformed image data (27). The transformed image data is used to image the printing plate. A method and apparatus for determining the locations of the points using backlighting avoids errors encountered in illuminating from the top.

17 Claims, 6 Drawing Sheets

PRINTING PLATE REGISTRATION USING A CAMERA

CROSS REFERENCE TO RELATED APPLICATIONS

Reference is made to commonly-assigned, copending U.S. patent application Ser. No. 11/204,223, filed Aug. 16, 2005, entitled PRINTING PLATE REGISTRATION AND IMAGING, by Neufeld et al., the disclosure of which is incorporated herein.

FIELD OF THE INVENTION

The invention relates to printing and, in particular to providing registered images on printing plates.

BACKGROUND OF THE INVENTION

Printing plates may be imaged on a plate-making machine and then transferred to a printing press. Once on the printing press, the images from the printing plates are transferred to paper or other suitable substrates. It is important that images printed using a printing press be properly aligned with the substrate on which they are printed. Obtaining such alignment typically involves:
- carefully aligning a reference edge of a printing plate with pins or other features on the plate making machine;
- detecting one reference point on an orthogonal edge of the printing plate (i.e. orthogonal to the reference edge) at a known distance from the reference pins;
- imaging the printing plate; and
- using the reference edge and the orthogonal edge reference point to align the printing plate on a drum of the printing press.

One common technique of aligning the printing plate on the drum of a printing press involves using the reference edge and the orthogonal edge reference point to align the printing plate on a punching machine and punching registration holes in the printing plate. The printing plate may then be aligned on the drum of the printing press with registration pins that project through the registration holes.

Traditionally mechanical alignment pins have been used to align the plate to be imaged to the drum of a platesetter. This is not a flexible arrangement. The pins have to be mounted in predetermined positions. There are also reliability challenges in consistently and accurately loading the plate into contact with the pins. It is also difficult to define sets of pins that allow a wide range of plate formats to be imaged whilst not interfering with one another.

There is therefore a need for a alignment mechanism not based on mechanical locating pins. A number of these have been proposed.

Techniques for detecting an edge of a printing plate, and any associated skew in the plate are disclosed in U.S. Pat. No. 6,321,651 (Tice et al.) and in U.S. Pat. No. 6,318,262 (Wolber et al.). In these patents edge detection sensors are employed in the load path to an imaging drum upon which a printing plate is imaged. U.S. Pat. No. 4,881,086 (Misawa) describes a laser recorder with sheet edge detection. The edge detection works on the principle of the difference in reflectivity between that of the sheet and that of the drum on which it is carried.

European Patent Application EP 1 081 458 A2 (Elior et al.) describes an apparatus for detecting a plate edge including an optical printhead for illuminating a plate system with a light beam having a focal point generally at the plate, a detector for measuring the intensity of the light reflected from the plate system, and means for altering the relative position of the edge of the plate and the light beam. EP 1 081 458 A2 also teach the use of this apparatus to determine a skew angle of the plate mounted on a plate support surface.

U.S. Pat. No. 6,815,702 (Kiermeier et al.) describes detecting the edge of a printing plate mounted on an external drum by using a light source and light sensor to measure the difference in reflectivity between the plate and drum surface. Two grooves formed in the drum surface are used to increase the difference in reflectivity between the plate and the drum. A difference in the positions where the plate covers each of the grooves is determined and compared against predetermined value to determine if a skewed plate is mounted on the drum.

U.S. Pat. No. 4,876,456 (Isono et al.) describe using photosensors having light emitting elements and light receiving elements disposed in a path for carrying a photosensitive film. The light emitting elements emit periodic pulsed light. When the film is present at the locations of the photosensors, the periodic pulsed light is reflected by the film to enter the light receiving elements thereby detecting the presence of the film. The activation time and activation interval of the light emitting elements are determined so that accumulated exposure value in each portion on the film is less than an upper limit value of accumulated exposure value of the photosensitive film.

In commonly-assigned U.S. patent application Ser. No. 11/204,223 an edge detection system is described, based on using a CCD camera to image the edges of a printing plate perpendicular to the sub-scan direction. Based on the information so obtained, the image data is then adjusted to compensate for any misalignment between the plate and the drum on which it is loaded.

The problem with front side illumination of printing plates on a platesetter is that the bevelled nature of the aluminium plate edge makes the determination of the outer mechanical limit of that edge rather difficult. This happens because both the flat top surface of the plate and the bevelled edge are likely to reflect the illuminating light when a CCD camera is used to image the edge.

A further limitation as regards front side illumination arises in the use of light sensitive plates, in which case light that could expose the emulsion has to be avoided.

There is therefore a need in the printing industry for a method and apparatus capable of consistently and automatically determining the outer mechanical edge of the plate that is to be imaged.

SUMMARY OF THE INVENTION

Briefly, according to one aspect of the present invention a method of imparting a print image on a printing plate comprises:
 a) mounting the printing plate on an imaging drum in an orientation wherein a reference edge of the printing plate extends along the drum in a substantially axial direction;
 b) determining a location of at least one point on the reference edge, wherein the determining comprises for each of the at least one point:
   i) illuminating a region, the region comprising at least a part of the reference edge associated with each point;
   ii) capturing at least one digital camera image of the region; and
   iii) locating the at least a part of the reference edge in the digital camera image; and
 c) imparting the print image on the printing plate in alignment with at least the determined location of the at least one point.

The present invention provides a method and apparatus for determining an alignment of a printing plate and imaging the printing plate in accordance with the determined alignment. The present invention comprises mounting the printing plate on an imaging support surface of a plate making machine and subsequently determining locations of at least one point on a reference edge of the printing plate relative to the surface. Based on the determined locations of each point on the reference edge, the method involves adjusting print image data such that a print image corresponding to a print image data is imparted on the printing plate in alignment with at least the determined locations of each point. An illumination source may be used to illuminate a region associated with each point, the region including at least a part of the reference edge. A digital camera may be used to take digital camera images of each region. The location of each point is determined at least in part by locating at least a part of the reference edge in each digital camera image. When at least one point includes at least two axially spaced apart points, a transformation required to impart the print image on the printing plate in a desired registration relative to the reference edge is determined. The transformation may include a rotation. The method also involves applying the transformation to digital image data to yield transformed image data and using the transformed image data to image the printing plate.

The present invention makes it unnecessary to accurately align the printing plate on the plate-making machine prior to imaging the printing plate.

A first aspect of the present invention provides a method of imparting a print image on a printing plate. The method includes mounting the printing plate on an imaging drum in an orientation in which a reference edge of the printing plate extends along the drum in a substantially axial direction. A location of each of the at least one point on the reference edge is determined. Determining the location of each point includes illuminating a region, the region including at least a part of the reference edge associated with each of the points. Determining each location also includes capturing at least one digital camera image of each region, and locating at least a part of the reference edge in the digital camera image. The method includes imparting the print image on the printing plate in alignment with at least the determined location of at least one point.

The at least one point may include at least two axially spaced apart points on the reference edge. The method may further include transforming print image data representing the print image in accordance with the determined locations of the at least two axially spaced apart points, to yield transformed print image data. The print image may be imparted on the printing plate using the transformed print image data, the imparted print image being aligned with the reference edge.

An illumination source may be used for illuminating each region and a digital camera may be used to capture the digital camera images. The illumination source and the digital camera are moved in an axial direction relative to the imaging drum. The method of the present invention is executed using a continuous light source. The imaging drum is kept stationary during the execution of the method of the invention. Determining the location of the at least one point includes determining an axial position of the digital camera relative to the drum when the digital camera is axially movable.

Locating the at least part of the reference edge in the digital camera image may include applying a correlation algorithm to distinguish an image of the at least a part of the reference edge from a prototype edge. Applying a correlation algorithm may include applying a Haar transform. Applying a correlation algorithm may also include applying a coiflet transform.

Locating the at least a part of the reference edge in the digital camera image may include performing a line detection algorithm. The printing plate may be substantially rectangular in shape, and include a pair of longer edges and a pair of shorter edges. The reference edge may be one of the longer edges.

In another aspect of the present invention, a method is provided for determining an alignment of a printing plate relative to an imaging drum on which the printing plate is mounted. The method includes determining a location of at least one point on a reference edge of the printing plate. The reference edge extends along the imaging drum in a substantially axial direction. Determining the location of each point includes illuminating a region including at least a part of the reference edge associated with each point. Determining the location of each point includes capturing at least one digital camera image of the region with a digital camera and locating at least a part of the reference edge in the digital camera image. The method provides for determining the alignment of the printing plate at least in part from the location of at least a part of the reference edge in the digital camera image of each point, and a position of the digital camera relative to the imaging drum during the capturing of at least one digital camera image of each point.

The at least one point may include at least two axially spaced apart points on the reference edge. The imaging drum may include at least one registration pin in contact with an edge of the printing plate. The alignment of the printing plate may further be determined from a position of at least one registration pin. The digital camera is mounted on a carriage operable for moving in an axial direction relative to the imaging drum. The alignment of the printing plate may further be determined from an axial position of the carriage.

In a further aspect of the present invention, a method for determining the location of a reference edge of a plate relative to a substrate on which the plate is mounted, comprises determining a location of at least one point on the reference edge, wherein the reference edge extends along a first direction on the substrate; the determining a location comprising illuminating a region, the region comprising at least a part of the reference edge associated with the at least one point; capturing at least one digital camera image of the region with a digital camera; locating the at least a part of the edge in the digital camera image; and determining the location of the at least one point from (i) a part of the reference edge in the digital camera image of the at least one point; and (ii) a position of the digital camera relative to the substrate during the capturing of the at least one digital camera image of the at least one point.

The locating at least a part of the reference edge can comprise locating a mechanical edge of the printing plate. The illuminating can be performed on the side of the plate that is in contact with the substrate. The illuminating can be spatially interrupted along an interrupting section of a part of the reference edge associated with each point. The illuminating can be by diffuse reflected light reflected from at least one diffusely reflective area on the substrate. The illuminating can be spatially interrupted by at least one non-reflective surface on the substrate. The reference edge can be positioned to extend over a slot in the substrate, the slot extending in substantially the first direction; and the at least one non-reflective surface and the at least one diffusely reflective surface can be on a recessed surface of the slot. The at least one diffusely reflective area can form an acute reflective apex with the perpendicular projection of the reference edge onto the recessed surface of the slot. The plate can be held to the substrate by at least one clamp and the imaging of the reference edge done through an imaging aperture in the at least one clamp while the illuminating is done through an illumination baffle in the at least one clamp. The substrate can be an imaging drum. The at least one point can comprise at least two spaced apart points on the reference edge. The digital camera can be mounted on a carriage operable for moving in the first direction relative to the surface and the location of the reference edge determined from a position of the carriage.

This aspect of the method of the invention can be combined with the method for determining an alignment of a printing plate relative to an imaging drum on which the printing plate is mounted and with the method of imparting a print image on a printing plate.

Yet another aspect of the present invention provides an apparatus for imparting a print image on a printing plate. The apparatus includes a substantially cylindrical imaging drum. The imaging drum includes means for securing the printing plate in an orientation in which a reference edge of the printing plate extends along the imaging drum in a substantially axial direction. The apparatus includes an illumination source operable for illuminating a region associated with each of at least one point on the reference edge. Each of the regions includes at least a part of the reference edge. The apparatus includes a digital camera operable for capturing a digital camera image of each region. The apparatus also includes one or more processors operable for determining a location of each point by at least locating the at least a part of the reference edge in each digital camera image. The one or more processors are further operable for adjusting print image data representing the print image in accordance with the determined locations of each point, the adjusted print image data including data to align the print image with at least the determined location of each point. The apparatus also includes an imaging head operable for receiving the adjusted print image data from the one or more processors and for imparting the print image onto the printing plate in accordance with the adjusted print image data.

The at least one point may include at least two axially spaced apart points on the reference edge. The one or more processors may be further operable for transforming the print image data into transformed print image data based on the determined locations of each of at least two axially spaced apart points. The transformed print image data includes data to align the print image with the reference edge. The image head may be further operable for imparting the print image on the printing plate in accordance with the transformed print image data, the imparted print image being aligned with the reference edge.

The apparatus may include a movable carriage operable for moving the imaging head in an axial direction relative to the imaging drum. The carriage may be further operable for moving at least one of digital camera and the illumination source in the axial direction. The digital camera may include one of a CCD sensor and a CMOS sensor. The illumination source may be a LED. The apparatus may further include a controller operable for analyzing the image obtained by the digital camera.

In yet a further aspect of the present invention, an apparatus for determining the location of a reference edge of a plate relative to a substrate on which the plate is mounted, is operable for illuminating the side of the plate that is in contact with the substrate. The substrate can be an imaging drum. The apparatus comprises a slot in the substrate, an illumination source operable for illuminating a region associated with a point on the reference edge, the region comprising at least a part of the edge; a digital camera operable for capturing a digital camera image of the region; and one or more processors operable for determining a location of the point by at least locating the at least a part of the reference edge in the digital camera image. The slot has a recessed surface and extending along the substrate in a first direction. The slot is configured to allow placement of the plate with the reference edge extending along the substrate in substantially the first direction with the reference edge protruding over the slot. The recessed surface of the slot can comprise at least one diffusely reflective surface. The recessed surface can comprise at least one substantially non-reflective surface. The at least one diffusely reflective surface can form an acute reflective apex with a perpendicular projection of the reference edge onto the recessed surface. The apparatus can further comprise at least one clamp for clamping the plate to the substrate at the point. The illumination source can be operable for illuminating the reference edge through the at least one clamp while the digital camera can be operable for imaging the reference edge through the at least one clamp. The at least one clamp can comprise an illumination baffle and an imaging aperture and the illumination source can operable for illuminating the reference edge through the illumination baffle in the at least one clamp while the digital camera can be operable for imaging the reference edge through the imaging aperture in the at least one clamp. The digital camera can be operable for imaging the reference edge through the imaging aperture using light from the illumination source, the light illuminating the recessed surface of the slot through the illumination baffle. The digital camera can comprise one of a CCD sensor and a CMOS sensor and the illumination source can be an LED.

This aspect of the apparatus of the present invention can be employed in an apparatus for determining an alignment of a printing plate relative to an imaging drum on which the printing plate is mounted and may also be employed in an apparatus for imparting a print image on a printing plate, as described here.

In addition to the exemplary aspects and embodiments described above, further aspects and embodiments will become apparent by reference to the drawings and by study of the following detailed descriptions.

BRIEF DESCRIPTION OF THE DRAWINGS

In the drawings which illustrate non-limiting embodiments of the invention.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Prior Art

Figure 1:
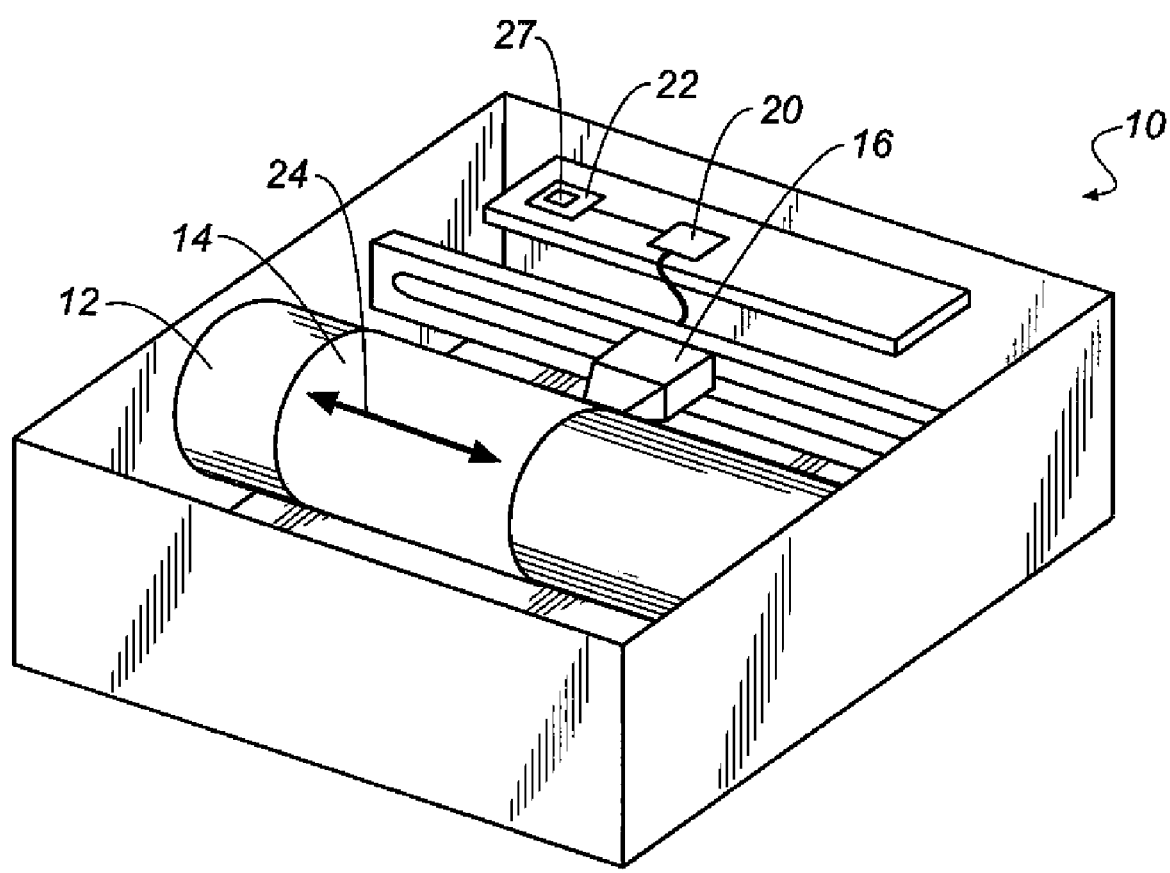
FIG. 1 is a schematic diagram of a prior art external drum-type plate-making machine.

FIG. 1 is a schematic depiction of a plate-making machine 10 having a drum 12 on which a printing plate 14 may be mounted. Plate-making machine 10 has an imaging head 16 which can impart an image onto printing plate 14. In the illustrated embodiment, imaging head 16 is axially movable relative to drum 12 (i.e. along the directions parallel to the axis of drum 12 indicated by double-headed arrow 24). Imaging head 16 typically includes a radiation source (not shown), such as a laser, which emits one or more beams of laser radiation capable of imparting an image onto printing plate 14. A controller 20 controls imaging head 16 and its associated radiation source in accordance with print image data stored in a memory 22, so as to image printing plate 14. The Trendsetter™ plate-setters available from Eastman Kodak Company represent examples of plate making machines having the basic configuration shown in FIG. 1.

Figure 2A:
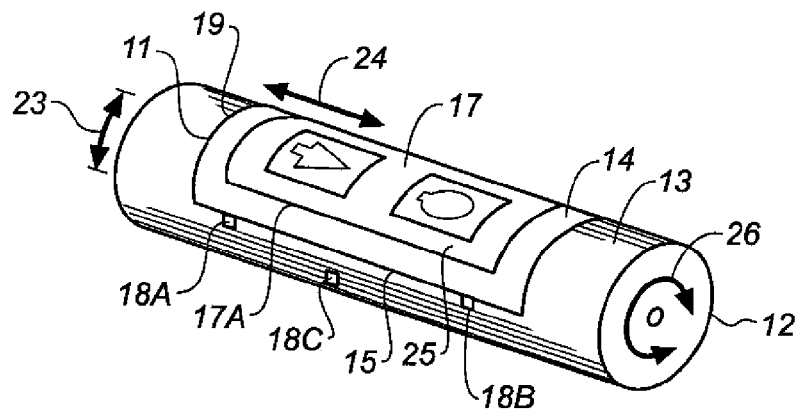
FIG. 2A is an isometric depiction of a printing plate mounted to a drum in the plate-making machine of FIG. 1.

FIG. 2A shows drum 12 of plate-making machine 10 in greater detail. Drum 12 has a plurality of registration pins 18A, 18B, 18C which project from its cylindrical surface 13. In the illustrated embodiment, drum 12 comprises three registration pins 18A, 18B, 18C, which may be offset slightly from one another around the circumference of drum 12 to enable imaging of different sizes of printing plates. A reference edge 15 of printing plate 14 is brought into engagement with two registration pins 18A, 18B. Typically, printing plate 14 is rectangular in shape and reference edge 15 may be one of the long edges of printing plate 14 (as depicted in FIG. 2A). The shorter, orthogonal edge 19 of printing plate 14 extends around the circumference of drum 12. An edge detector (not shown) detects the position of a third reference point 11 on orthogonal edge 19 of printing plate 14. Orthogonal edge reference point 11 is located at a fixed circumferential distance 23 relative to registration pins 18. Printing plate 14 is clamped onto drum 12 using any suitable clamping system (not shown). Typically, clamping systems clamp to reference edge 15 and to an opposing edge of printing plate 14 (not shown) that is parallel to reference edge 15.

With printing plate 14 clamped and registered, drum 12 is rotated about its axis in either or both of the main-scan directions indicated by arrow 26, while imaging head 16 is scanned axially along drum 12 (i.e. in the directions indicated by arrow 24). Controller 20 controls the relative movement of imaging head 16 and drum 12 and controls the radiation source in imaging head 16 in accordance with print image data 27 to impart an print image 17 onto printing plate 14. An edge 17A of print image 17 is created substantially parallel to reference edge 15. The region 25 of printing plate 14 that is adjacent to reference edge 15 and the region (not shown) that is adjacent to the opposing edge of printing plate 14 are covered by the clamping system and are not imaged.

Figure 2B:
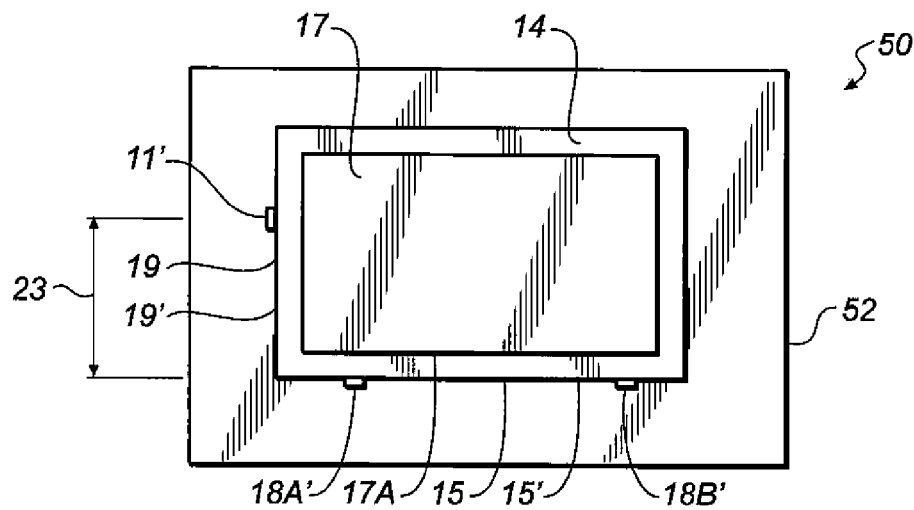
FIG. 2B is a top elevation view of an imaged printing plate in a prior art punching machine.

After being imaged on plate-making machine 10, printing plate 14 may be punched in a punching machine 50 as shown in FIG. 2B. Printing plate 14 is registered on punch table 52 of punching machine 50 by bringing it into engagement with two registration surfaces 18A', 18B' on its reference edge 15 and registration surface 11' on its orthogonal edge 19. The position and orientation of the two registration surfaces 18A', 18B' on punch table 52 (as measured with respect to each other and with respect to printing plate 14) may be substantially the same as the registration pins 18A and 18B on plate-making machine 10. Punch table 52 comprises a third registration surface 11' that is located a circumferential distance 23 from registration pins 18A, 18B, 18C. Thus, registration surface 11' is located in the same position as orthogonal edge reference point 11 on plate-making machine 10 (see FIG. 2A). With printing plate 14 registered to surfaces 18A', 18B', 11', punching machine 50 creates a number of punched features (not shown) in printing plate 14. The punched features created by punching machine 50 may have a wide variety of shapes, sizes and orientations. However, because the registration points are the same when printing plate 14 is imaged (18A, 18B, 11) and when it is punched (18A', 18B', 11'), the locations of the punched features are known precisely with respect to image 17.

Figure 2C:
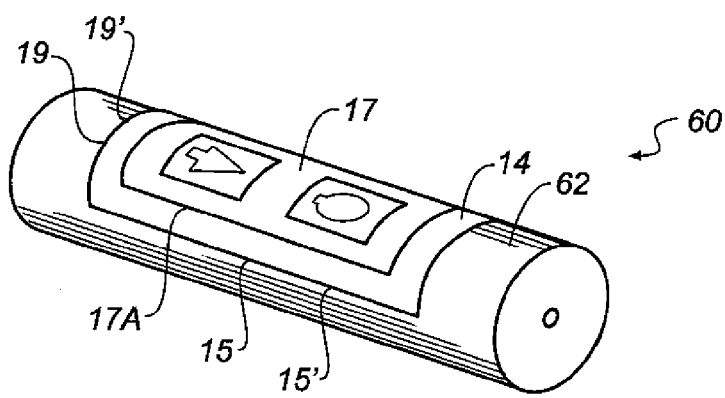
FIG. 2C is an isometric view of an imaged printing plate mounted on the drum of a prior art printing press.

Once printing plate 14 is punched, reference edge 15 and the opposing edge (i.e. parallel to reference edge 15) of printing plate 14 may be bent (not shown). As shown in FIG. 2C, printing plate 14 is then mounted on a press cylinder 62 of a printing press 60. The clamping system (not shown) of printing press 60, which is used to mount printing plate 14 to press cylinder 62, may comprise registration pins (not shown) which project through the features punched in printing plate 14 to secure printing plate 14 to press cylinder 62. The clamping system may also use the bent edges of printing plate 14 (if present) to secure printing plate 14 to press cylinder 62. When printing plate 14 is securely mounted to press cylinder 62, the clamping system overlaps non-imaged region 25 of printing plate 14 (i.e. adjacent to reference edge 15) and the non-imaged region adjacent the opposing edge of printing plate 14 (i.e. the edge parallel to reference edge 15). In this manner, the clamping system of printing press 60 does not impede print image 17 on printing plate 14. Print image 17 is then transferred to a substrate (not shown) by applying ink to printing plate 14 and rolling drum 62 to bring inked image 17 into contact with the substrate.

The Present Invention

Figure 3:
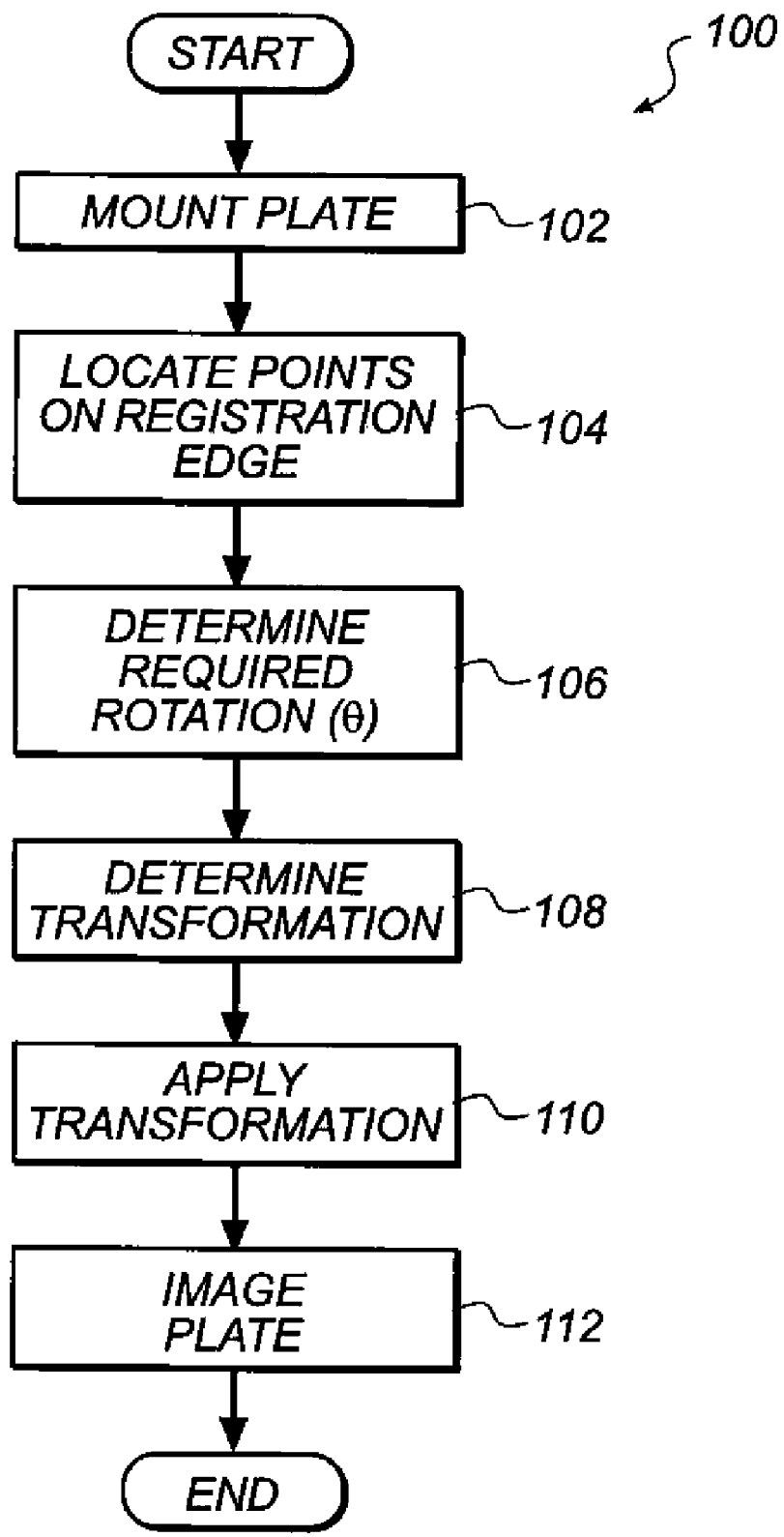
FIG. 3 is flow chart illustrating one embodiment of a method for imaging a printing plate according to the invention.
Figure 4A:
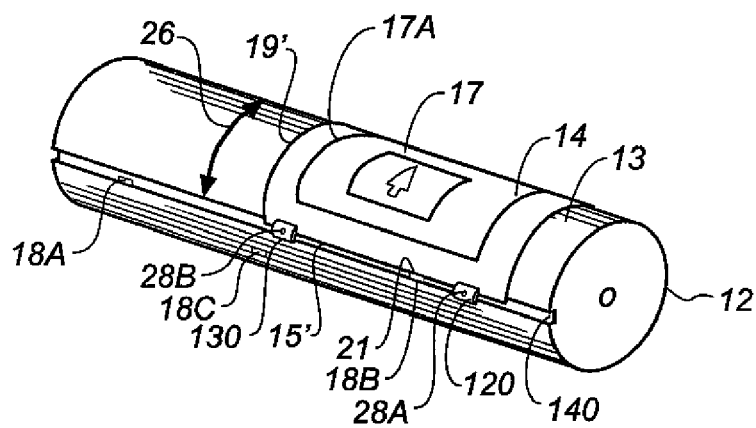
FIG. 4A is an isometric depiction of a printing plate mounted to a drum of a plate-making machine according to a particular embodiment of the invention.

FIG. 3 shows a method 100 for registering and imparting print image 17 of FIG. 4A onto printing plate 14. FIG. 4A depicts printing plate 14 on cylindrical surface 13 of drum 12 of a plate-making machine according to one embodiment of the present invention. Method 100 begins with block 102, which involves mounting printing plate 14 on drum 12 of a plate-making machine. The plate-making machine could be an external drum-type plate-making machine, as shown in FIG. 1. Alternatively, the plate-making machine could be an internal drum-type plate-making machine.

In the illustrated embodiment of the present invention (FIG. 4A), printing plate 14 is mounted to cylindrical surface 13 of a drum 12 of an external drum-type plate making machine with its shorter edge 19' extending, at least partially, in a circumferential or main-scan direction 26 around drum 12. The longer reference edge 15' of printing plate 14 extends in the axial or sub-scan direction along drum 12, clamped by at least two clamps 120 and 130. To assist in positioning printing plate 14, printing plate 14 may optionally touch at least one of optional reference pins 18A, 18B, 18C on drum 12 to provide a single orthogonal edge reference point 21.

At least two clamps 120 and 130, described in more detail below, hold printing plate 14 on drum 12 of the plate making machine and are themselves fastened to drum slot 140 in a manner that leaves at least a portion of reference edge 15' exposed through each of at least two clamps 120 and 130 in a manner described in more detail below. At least one clamp 120 and 130 hold printing plate 14 on drum 12 at least two reference points 28A and 28B. Clamps 120 and 130 may be individual clamps or may be segments of a single larger clamp. The single large clamp may extend along the whole length, or substantially the whole length, of drum 12. Clamps 120 and 130 are located in fixed known positions.

In block 104 of FIG. 3, the positions of the at least two reference points 28A, 28B on reference edge 15' are determined. Reference points 28A, 28B may be found using the backlit edge method and apparatus of the present invention, described in detail below.

Figure 4B:
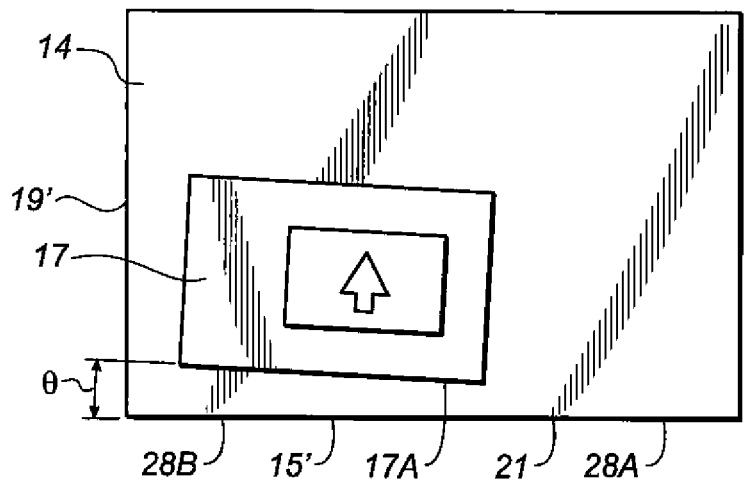
FIG. 4B shows a plan view of an imaged printing plate mounted in a skewed orientation.

FIG. 4B shows a plan view of an imaged printing plate 14 that has been mounted in a skewed orientation with respect to an axis of imaging drum 12. If the skew is not addressed, print image 17 may be imparted onto printing plate 14 such that an edge 17A of print image 17 may form an angle θ with respect to reference edge 15'. The amount of skew represented by angle θ has been exaggerated in FIG. 4B for the purposes of clarity and may be less or more than the angle shown. Referring back to FIG. 3, in block 106 the locations of the at least two reference points reference 28A and 28B are used to determine angle θ by which print image 17 should be rotated to properly align an edge 17A of print image 17 with reference edge 15' of printing plate 14. In block 108, the rotation angle θ determined in block 106 is used to generate a transformation to be applied to print image data. The transformation may combine rotation and translation to map each image point in the print image data to a transformed image point.

The transformation is applied to print image data in block 110 of FIG. 3 to produce transformed image data. The transformation may be determined (in block 108) and applied to print image data (in block 110) by a data processor at the plate-making machine. For example, a processor in controller 20 may determine the transformation from data provided by the edge finder and apply the transformation to print image data.

In block 112 of FIG. 3, the transformed print image data is used by controller 20 to drive imaging head 16 and its associated radiation source, so that print image 17 is imparted on printing plate 14. As discussed above, imaging head 16 moves in the axial sub-scan directions (see arrow 24 of FIG. 1) to impart print image 17 onto printing plate 14 while drum 12 rotates in a main-scan directions (see arrow 26 of FIG. 1). To the extent that the axial edges of printing plate 14 need to be known, they can be determined by the method of commonly-assigned U.S. patent application Ser. No. 11/204,223.

Print image 17 imparted onto printing plate 14 will have an edge 17A that is aligned with reference edge 15' of printing plate 14. In some embodiments, print image 17 imparted onto printing plate 14 may have some other desired registration relative to reference edge 15'. This other desired registration may be repeated for other associated plates made in the plate-making machine to assure registration among all the associated plates when mounted on a printing press.

After printing plate 14 is imaged, it may be punched on a punching machine 50 (see FIG. 2B). Registration surfaces 18A', 18B' of punching machine 50 are typically aligned with edge detected reference points 28A, 28B on reference edge 15' of printing plate 14. Similarly, registration surface 11' of punching machine 50 is typically aligned with orthogonal edge reference point 21. Because of the registration of reference points 21, 28A, 28B to registration surfaces 11', 18A', 18B', when printing plate 14 is punched, the locations of the punched features are known precisely with respect to print image 17. If required, reference edge 15' and the opposing edge (i.e. parallel to reference edge 15') of printing plate 14 may be bent (not shown).

Printing plate 14 may then be mounted onto press cylinder 62 of a printing press 60 (see FIG. 2C). When printing plate 14 is mounted on the press cylinder of a printing press, it is preferably mounted such that its reference edge 15' extends in an axial direction (i.e. parallel to the axis of the press cylinder). The clamping system of printing press 60 may comprise registration pins which project through one or more of the punched features in printing plate 14 to secure printing plate 14 to press cylinder 62. The clamping system of printing press 60 may also use the bent edges of printing plate 14 to secure it to press cylinder 62. Once mounted to press cylinder 62, print image 17 can be inked and transferred to paper and/or other suitable substrates.

Figure 5:
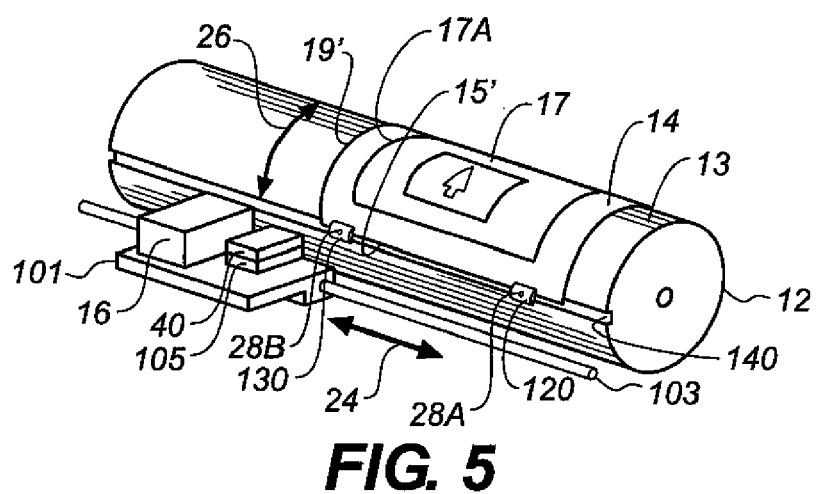
FIG. 5 is a schematic illustration of a plate-making machine according to one embodiment of the invention.

In the embodiment of FIG. 5, a digital camera 40 is affixed to carriage 101 of an external drum plate-making machine or platesetter. Digital camera 40 can include one of a CCD sensor and a CMOS sensor. Carriage 101 moves along lead screw 103 in a direction given by arrow 24. Digital camera 40 has a known position and orientation relative to drum 12 of FIG. 4A. In FIG. 5 carriage 101 is shown in a position relative to drum 12 that allows the accurate determination of point 28B in particular. Illumination source 105 is affixed to digital camera 40 and illuminates reference edge 15' through channels in at least two clamps 120 and 130 and digital camera 40 captures images of reference edge 15' through openings in at least two clamps 120 and 130 located at reference points 28A, 28B on reference edge 15' using the backlit edge method and apparatus of the present invention, described in detail below. Illumination source 105 can be an LED. In FIG. 5, illumination source 105 is shown in a position to illuminate point 28B through clamp 130 in particular. The images are processed to identify reference edge 15' and to accurately determine the locations of the two or more reference points 28A, 28B on reference edge 15'. A line detection algorithm may be used to locate reference edge 15' at each of the at least two reference points 28A and 28B. A straight line may be fitted to the located reference edge 15'. The positions of the two or more reference points 28A, 28B on reference edge 15' may be determined from the fitted line. Alternatively, the plate-making machine could be an internal drum-type plate-making machine.

In the illustrated embodiment of the present invention shown in FIG. 5, printing plate 14 is mounted to a drum 12 of an external drum-type plate making machine with its reference edge 15' (i.e. the longer edge of printing plate 14 in this embodiment) extending axially along the cylindrical surface 13 of drum 12. Reference edge 15' of printing plate 14 may optionally touch at least one of reference pins 18A, 18B, 18C on drum 12 (see FIG. 4A) to assist in positioning printing plate 14 such that its reference edge 15' protrudes partially over drum slot 140.

At least two clamps 120 and 130 hold printing plate 14 on drum 12 of the plate making machine in a manner that allows illumination source 105 to illuminate reference edge 15' through channels or illumination baffles in at least two clamps 120 and 130 and digital camera 40 to capture images of reference edge 15' through openings in at least two clamps 120 and 130 located at reference points 28A, 28B on reference edge 15' using the backlit edge method and apparatus of the present invention, described in detail below.

In the embodiment shown in FIG. 5, a plate-making machine includes an imaging head 16 that is affixed to movable carriage 101. The plate-making machine also includes mutually affixed illumination source 105 and digital camera 40. In other embodiments of the present invention, illumination source 105 and/or digital camera 40 may be affixed to imaging head 16. In other embodiments, digital camera 40, illumination source 105 and imaging head 16 may be variously affixed to one another, or not, or may travel along direction 24 independent of one another. A digital camera with a relatively small field of view may be employed. A digital camera 40 that may employ a small field of view includes the Black and White Ultra-Miniature Camera, Model WDH-2500, manufactured by the Weldex Corporation. In this embodiment of the present invention, digital camera 40 can be moved over a larger sub-scan distance than the field of view of digital camera 40 to find various points along reference edge 15' where printing plate 14 is clamped by at least two clamps 120 and 130. Illumination source 105 and digital camera 40 may be employed to capture images of the at least two reference points 28A, 28B on reference edge 15'. In other embodiments of the present invention, illumination source 105 and digital camera 40 may be employed to capture digital camera images of various points along the reference edge 15' of each of a plurality of plates 14 mounted on drum 12. In other embodiments of the present invention, illumination source 105 illuminates a region that includes at least a part of reference edge 15' associated with least one point found on reference edge 15'. The at least one point may correspond to one or more of the at least two or more reference points 28A and 28B.

In yet other embodiments of the present invention, the plate-making machine may include a plurality of imaging heads 16. Each of the plurality of imaging heads 16 may be used to image at least one of a plurality of printing plates 14 mounted on drum 12. A separate digital camera 40 and illumination source 105 may be associated with each of the plurality of imaging heads 16 and be used to capture digital camera images of various points along the reference edge 15' of the corresponding printing plates that is imaged by the specific imaging head.

In preferred embodiments of the present invention, the digital camera images captured by digital camera 40 may be analyzed by one or more image data processors (not shown) to identify reference edge 15' and to determine the locations of at least two reference points 28A and 28B on reference edge 15'. Controller 20 may include the one or more image data processors. Controller 20 may determine the location of at least two reference points 28A and 28B and determine the alignment of printing plate 14 relative to imaging drum 12. Controller 20 may provide the necessary instructions to impart print image 17 onto printing plate 14. When the location of at least two reference points 28A and 28B on reference edge 15' is determined, print image 17 may be imparted onto printing plate 14 in alignment with the determined at least two reference points 28A and 28B. Controller 20 may include a processor to adjust print image data to produce adjusted print image data that aligns print image 17 on printing plate 14 relative to at least two reference points 28A and 28B. A line detection algorithm may be used to locate reference edge 15' in each of the captured digital camera images. A best-fit straight line may be fitted to the located reference edge 15'. The positions of the two or more reference points 28A, 28B on reference edge 15' may be determined from the fitted line. Referring back to FIG. 3, controller 20 may determine the necessary transformation in accordance with the determined positions of reference points 28A and 28B in block 108. The transformation is applied to print image data in block 110 to produce transformed print image data. The transformed print image data is then communicated to imaging head 16 to impart print image 17 in the desired alignment with reference edge 15'.

To determine the alignment of printing plate 14 relative to imaging drum 12 as well as drum transformation for print image data, the one or more image data processors requires positional information (preferably with respect to imaging drum 12) of the captured camera data of the reference points 28A and 28B. Digital camera 40 may be attached to an axially translating point such as carriage 101 or imaging head 16. In either case, circumferential or main-scan information of the captured digital camera image at a given reference point may be obtained from data provided by the imaging drum 12 rotational position encoder (not shown). The encoder defines specific main-scan positions of imaging drum 12 that are typically indexed to an index start point. The index start point may be defined by at least one of the registration pins 18A, 18B and 18C of drum 12. The encoder provides imaging drum rotational position information that is used to coordinate the activation of imaging head 16 as it translates along sub-scan direction to correctly impart an image onto printing plate 14. Main-scan positional calibration of digital camera 40 may include capturing digital camera images of a feature incorporated in the surface of imaging drum 12; the main-scan positional coordinates of the feature being known.

The sub-scan positional coordinates of the captured images at the reference points must also be known, since digital camera 40 is mounted on carriage 101 or imaging head 16. Carriage 101 typically moves axially in synchronism with the rotation of drum 12. Positional control of carriage 101 may be accomplished by numerous methods known in the art. Sub-scan positional calibration of digital camera 40 may be accomplished by several methods. One method may include capturing digital camera images of a feature incorporated in the surface of imaging drum 12; the sub-scan positional coordinates of the feature being known. Another method may include additionally detecting a specific reference point on reference edge 15' by another means such as a focus laser that is part of imaging head 16. The sub-scan position detected by digital camera 40 is then compared to the corresponding coordinates determined by the focus laser. Yet another method may include imparting an image feature onto printing plate 14 with imaging head 16. Carriage 101 may be positioned to a specific sub-scan position to capture a digital camera image of the feature.

Digital camera pixel scaling calibration determines the number of microns per camera pixel. Digital camera pixel scaling calibration may be determined by imaging a feature of known size and assessing the how many pixels wide it is. Yet another method of pixel scaling calibration may include imaging a feature onto printing plate 14 at a first known sub-scan position. Carriage 101 may then be moved to a second known sub-scan position to image the feature again. Digital camera 40 may be used to capture a digital camera image of the two imaged features, the distance between the two imaged features being the same as the distance between the first and second known sub-scan positions.

In preferred embodiments of the present invention, imaging head 16 and digital camera 40 are moved axially in the sub-scan direction indicated by arrow 24, while imaging drum 12 is kept stationary. Digital camera 40 may capture digital camera images at sub-scan positions corresponding to the at least two reference points 28A and 28B. Digital camera 40 may send data corresponding to each of the digital camera images to an image data processor which identifies a representation of the at least a part of reference edge 15' within the images. The main-scan coordinates of the at least two reference points 28A and 28B are determined in accordance with data provided by the drum rotational encoder (not shown) and the representation of the at least a part of reference edge 15' at the at least two reference points 28A and 28B.

The Haar transform is an established mathematical technique in image processing. In a preferred embodiment of the present invention, the Haar transform is used to "pattern match" a prototype edge with the sequence of values derived from vertically integrating the digital camera image pixels. The Haar transform is applied to a (narrower) sequence of vertically integrated prototype edge values to produce a first vector. The Haar transform is also applied to a portion of a sequence of the digital camera image vertically integrated values to produce a second vector. The dot product of these two vectors is referred to as correlation. Correlation is a measure of the pattern match between the prototype edge and an edge found at that location in the digital camera image. This process is repeated for alternate portions of the sequence of the digital camera image integrated values, to produce a correlation graph. Each of the alternate portions typically starts at each consecutive pixel location of the digital camera image. The location of maximum correlation (i.e. the global maximum) has a high probability of corresponding to the reference edge portion in the image.

The global maximum of the correlation graph may in some cases, lead to an erroneous result. There may be other local maxima in the graph, one of which may correspond to the reference edge. A local maximum may be located by applying a similar wavelet transform to the correlation graph. A coiflet transform operation may be applied to the entire correlation graph, producing a coiflet transform vector. A threshold may be selected wherein values below the threshold are reduced to zero. The transform operation may then be reversed and a modified version of the correlation graph reproduced. This technique may be commonly employed in image compression. In the present invention, the compression applied may be of a magnitude that the modified version of the correlation graph is a sequential series of width and height scaled coiflet mother wavelets. Each of the local maxima present in the original correlation graph will typically become the center (peak) of one of the mother wavelets. Finding the locations of the local maxima is simply a matter of listing the locations of the mother wavelets. In this way, an image may have several possible choices of locations for the imaged portion of the reference edge, some more likely to be correct than others.

It is to be understood that the present invention is not limited to the use of the Haar transform and suitable correlation or convolution algorithm may be used to distinguish between the prototype edge and video images. In addition, speed improvements may be made by setting Haar transform vector values to zero if they are under a predetermined threshold before taking the dot product. The present invention may further use any suitable image processing method and associated edge detection algorithm to distinguish the portion of reference edge 15' captured in the video frames. The position of the least two reference points 28A and 28B may be determined by the identification of these locations and from imaging drum 12 and carriage 101 positional information during the capturing of the images at reference points 28A and 28B. The determined locations of the at least two reference points reference 28A and 28B may then be used to determine a transform to apply to print image data such that when the transformed print image data is communicated to imaging head 16 and its associated radiation source, print image 17 is substantially aligned with reference edge 15'.

Printing plate 16 and imaging drum 12 may have surface imperfections that may appear to produce images that may obscure the contrast of the reference edge 15' at the detected positions. The surface imperfections themselves may have a form and shape that may lead to erroneous results if the edge detection algorithms employed mistakenly interpret the imperfections as part of reference edge 15' Erroneous results may also occur if the edge detection algorithms interpret regular imaging drum 12 features as part of reference edge 15'. A plurality of locations oriented along the sub-scan direction 26 may be imaged by digital camera 40 and defined by a suitably chosen edge detect algorithm. The plurality of locations may be greater in number than the at least two reference points 28A and 28B. If each location produces at least one edge value, a best-fit straight line may then be fitted through these points. The best-fit straight line forms a relationship between the determined sub-scan or axial locations of the plurality of points and their corresponding circumferential locations to assess the accuracy of the determined locations with respect to the straight line that theoretically represents a straight plate edge.

Each digital camera image from the plurality of locations along the sub-scan direction may instead result in a plurality of possible reference edge positions in at least one of the locations, each associated with a figure of merit. An algorithm for fitting a straight line can be designed to select from the possible reference edge locations, with a higher weighting for edge locations with a high figure of merit. If one or a few of the high figure of merit reference edge locations do not lie in a straight line and a lower figure of merit edge location does lie nearer the straight line, it may be selected instead. Standard methods for best straight-line fitting may be applied to the selected set of reference edge locations. The locations of reference points 28A and 28B will typically lie on, or very close to the fitted straight line. Once the locations of the at least two reference points 28A and 28B are confirmed and/or adjusted, the transformation for print image data may be determined.

Certain implementations of the invention comprise computer processors that execute software instructions that cause the processors to perform a method of the invention. For example, one or more data processors in controller 20 may implement method 100 of FIG. 3 by executing software instructions in a program memory accessible to the processors. The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Figure 6:
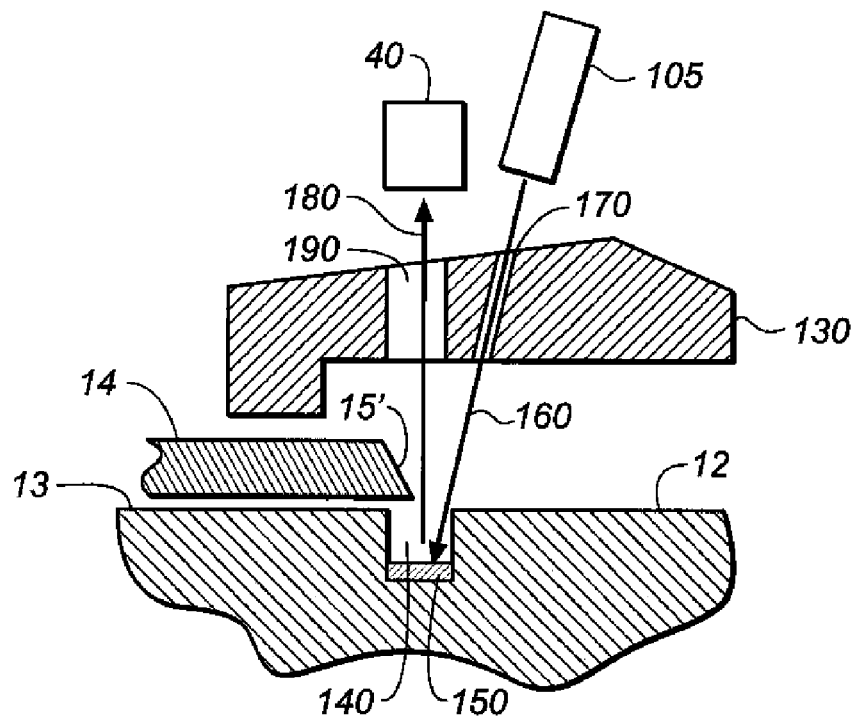
FIG. 6 is a schematic illustration of a digital camera based arrangement for imaging the edge of a printing plate by the method of the present invention.
Figure 7:
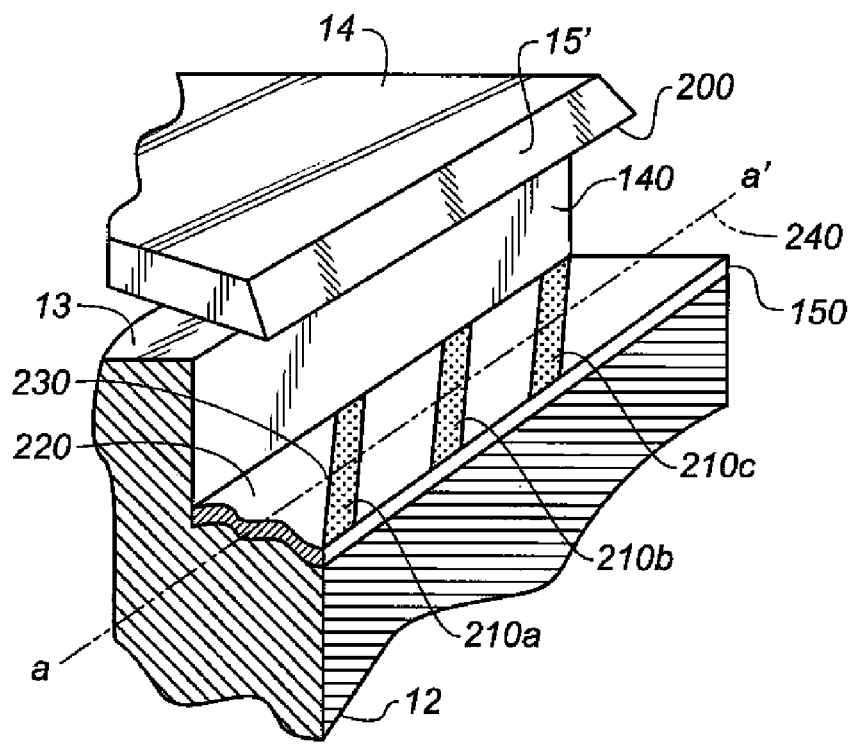
FIG. 7 is a cutaway drawing of the drum of a plate-making machine, showing the slot in the drum and the placement of diffusely reflecting and non-reflecting members.

The backlit edge method and apparatus of the present invention are described at the hand of FIGS. 5, 6 and 7. FIG. 6 is a cross-section of drum 12 and of clamp 130 located at point 28B of FIG. 5. In FIG. 6 printing plate 14 is held to surface 13 of drum 12 by clamp 130 such that reference edge 15' of printing plate 14 protrudes over drum slot 140 in drum 12. As is shown in FIG. 5, carriage 101 may be moved such that digital camera 40 is in a position to image reference edge 15' of printing plate 14 at point 28B through clamp 130 and that illumination source 105 may simultaneously illuminate reference edge 15' at point 28B through clamp 130. This arrangement is shown in detail in FIG. 6, in which illumination source 105 illuminates diffusely reflective layer 150 that has a diffusely reflective surface, located in the bottom of drum slot 140 on a radially recessed surface, through illumination baffle 170 of clamp 130 with illuminating light beam 160. Diffusely reflected light 180 is gathered by digital camera 40 through imaging aperture 190 in clamp 130 and is used by digital camera 40 to capture an image of point 28B. The illuminating is therefore performed on the side of the printing plate that is in contact with the imaging drum. In FIG. 6 reference edge 15' is specifically shown with a bevel angle produced by the cutting of the un-imaged printing plate 14. If printing plate 14 and reference edge 15' were to be illuminated from the top instead of as in the present invention, the light reflected from the top surface of printing plate 14 and the light reflected from the bevel edge of reference edge 15' would make it very difficult to determine the actual mechanical edge of reference edge 15' of printing plate 14. By diffusely illuminating the surface of printing plate 14 that faces away from digital camera 40, using the light diffusely reflected by diffusely reflective layer 150, the contrast between the true mechanical edge of reference edge 15' and diffusely reflective layer 150 is much improved through the reflection of light from any surfaces of printing plate 14 having been limited. This allows more accurate determination of the true mechanical edge of reference edge 15' of printing plate 14 by the image analysis methods described herein.

In a further embodiment of the present invention, the contrast may be further enhanced, and the true mechanical edge of reference edge 15' of printing plate 14 more precisely determined, by employing the arrangement of FIG. 7. FIG. 7 shows a cutaway of drum slot 140 in drum 12 of FIG. 5. Printing plate 14 having beveled reference edge 15' with mechanical edge 200 is clamped to the cylindrical surface 13 of drum 12 by a clamp (not shown in the interest of clarity). Mechanical edge 200 has perpendicular projection 240 on diffusely reflective layer 150 given by line a-a'. In this embodiment of the present invention diffusely reflective layer 150 has upon its surface facing digital camera 40 a plurality of non-reflective areas 210a, 210b and 210c. Any shape may be chosen for the non-reflective areas 210a, 210b, 210c, though shapes having perimeters that form at least one acute angle with reference edge 15' are preferred. In FIG. 7 non-reflective areas 210a, 210b, 210c, in the form of diagonally slanted strips, have been chosen as being one simple choice that satisfies this preference. Acute reflective apex 230 is formed in the reflective part of diffusely reflective layer 150 between perpendicular projection 240 and non-reflective area 210a. Similar acute reflective apexes are formed between perpendicular projection 240 and non-reflective areas 210a and 210b and are not indicated in FIG. 7 for the sake of clarity. The image of point 28B obtained by digital camera 40 comprises at least one non-reflective area 210a, at least one acute reflective apex 230 and reference edge 15'. The image of reference edge 15' so obtained comprises mechanical edge 200, if a bevel is present on the particular printing plate 14. The illuminating of reference edge 15 is thus spatially interrupted along an interrupting section of that part of the reference edge 15' that is associated with point 28B.

Given that light diffusely reflected from diffusely reflective layer 150 may potentially illuminate the beveled surface of printing plate 14 along reference edge 15', non-reflective areas 210a, 210b, 210c, provide for regions of mechanical edge 200 of reference edge 15', corresponding to non-reflective areas 210a, 210b, 210c, substantially not being illuminated at all. On the other hand, regions of mechanical edge 200 of reference edge 15', corresponding to reflecting region 220 of diffusely reflective layer 150 may conversely be illuminated, depending on the angle of the bevel of reference edge 15'. By imaging reference edge 15' in the vicinity of acute reflective apex 230 mechanical edge 200 of reference edge 15' may be determined very accurately in the illuminated area adjacent to acute reflective apex 230. In regions of mechanical edge 200 of reference edge 15', protruding over non-reflective areas 210a, 210b, 210c, mechanical edge 200 cannot be identified for lack of illumination, while, in regions of mechanical edge 200 of reference edge 15' protruding over reflecting region 220 of diffusely reflective layer 150, illumination of the beveled surface of reference edge 15' by stray diffusely reflected lighted light from reflecting region 220 may still potentially induce small errors in the locating of mechanical edge 200 in the image. Optimally accurate determination of the location of mechanical edge 200 therefore occurs in those regions of reference edge 15' protruding over acute reflective apex 230 of the reflective part of diffusely reflective layer 150. Again, the determination of mechanical edge 200 from the image obtained by camera 40 at point 28B occurs by the analysis process already described. It is to be noted that, in the case of a printing plate 14 having reference edge 15' with a bevel of the opposite sense to that shown in FIGS. 6 and 7, mechanical edge 200 is the outer edge imaged by default by digital camera 40 and no light directly reflected by that beveled surface can reach digital camera 40 to create an image that might mislead the user as to the exact location of mechanical edge 200.

Since reference edge 15' has to be determined at least two axial points 28A and 28B along drum 12 in order to determine the required image rotation, the arrangement described here may be repeated at a plurality of points along the clamping system of drum 12. Typical drum systems have continuous or segmented clamp arrangements, spanning substantially the entire axial width of drum 12. In a further implementation of the present invention a single clamp 120, 130 can therefore have a plurality of mutually fixed arrangements of illumination baffles 170 and imaging apertures 190, the result being that, in any chosen region along the axial length of reference edge 15' there is always a nearby set of illumination baffle 170 and imaging aperture 190 that can be used to implement the edge detection method of the present invention.

In yet a further embodiment of the present invention, a series of non-reflective areas 210a, 210b, 210c are fashioned on diffusely reflective layer 150 in the vicinity of a chosen point 28B such that the image captured by digital camera 40 comprises a plurality of images of non-reflective areas 210a, 210b, 210c. This provides a plurality of acute reflective apexes 230 at which mechanical edge 200 can be determined, thereby improving the accuracy of the analysis yet further. Non-reflective areas may be fashioned on diffusely reflective layer 150 along substantially the entire length of slot 140.

Figure 8:
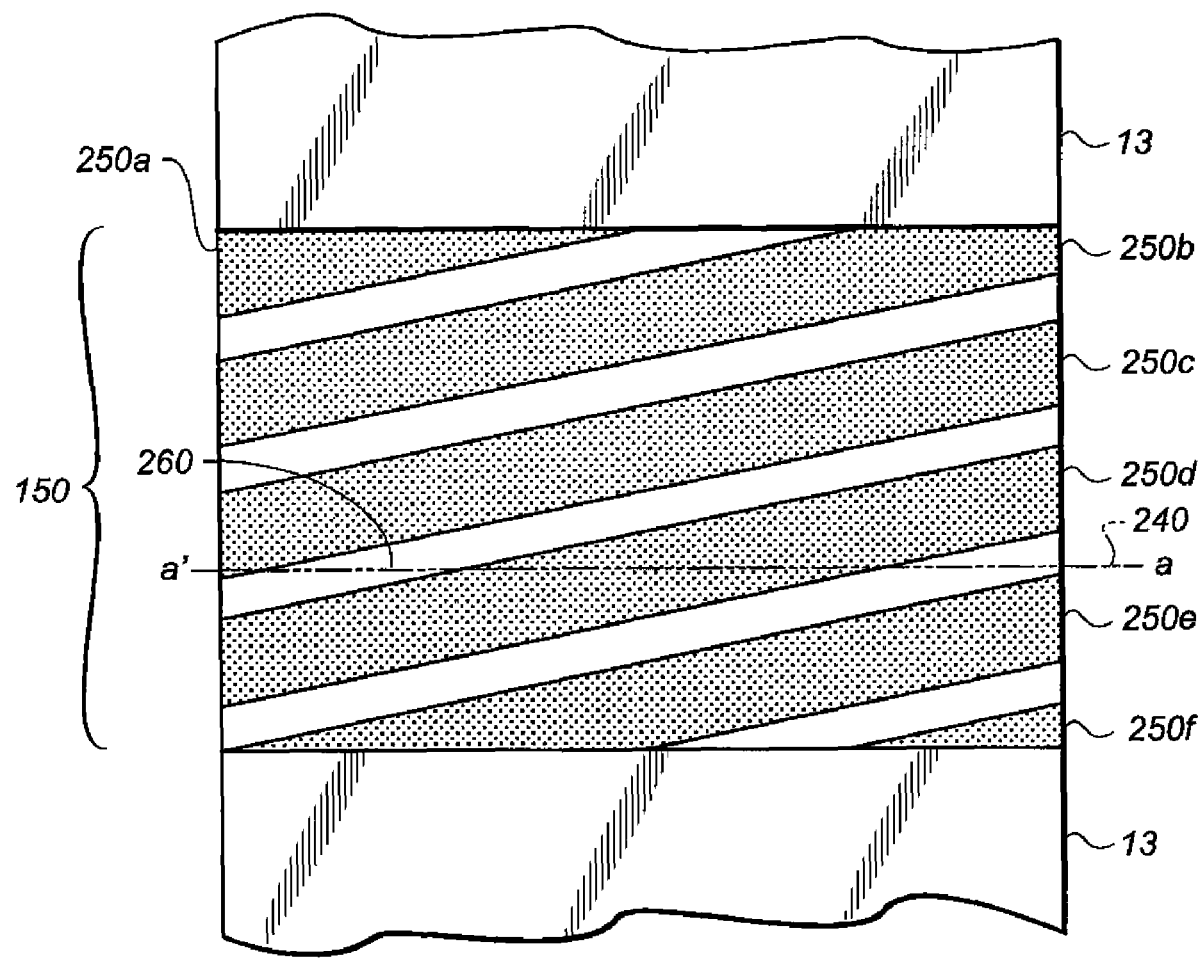
FIG. 8 is a plan view of the slot in the drum of a plate making machine.

In FIG. 8 yet a further embodiment of the present invention shows a plan view of drum slot 140 of drum 12 at point 28B of FIG. 5, as illuminated by illumination source 105 (not shown). Non-reflective areas 250a, 250b, 250c, 250d, 250e and 250f on diffusely reflective layer 150 have edges making very acute angles with perpendicular projection 240 of mechanical edge 200 of reference edge 15' of printing plate 14, which protrudes over the edge of drum slot 140. In FIG. 8, printing plate 14, reference edge 15' and mechanical edge 200 are not shown for the sake of clarity and perpendicular projection 240, denoted by the line a-a', represents the circumferential location of mechanical edge 200 in the image of point 28B. Similarly, clamp 130, which clamps printing plate 14 to cylindrical surface 13 of drum 12, as in FIG. 5, is not shown in FIG. 8 for the sake of clarity. Acute reflective apex 260, in this embodiment of the present invention, is very acute. Any cross-slot repositioning of reference edge 15', and thereby of perpendicular projection 240, will cause the position of acute reflective apex 260 to move by a large amount in the axial direction of drum 12 along perpendicular projection 240. To ensure that there is always at least one acute reflective apex in the field of view of digital camera 40, non-reflective areas 250a, 250b, 250c are fashioned in high density across slot 140 as shown in the circumferential direction of drum 12. As a result, a plurality of non-reflective areas 250a, 250b, 250c will be crossed by perpendicular projection 240 as reference edge 15' is repositioned circumferentially with respect to drum 12 (of FIG. 5) over drum slot 140. This results in an increased likelihood of an acute reflective apex 260 being located in the image obtained by digital camera 40. Additionally, the fact that acute reflective apex 260 is more acute in this embodiment of the present invention, allows a larger vicinity of acute reflective apex 260 to be employed in locating perpendicular projection 240, and, thereby, mechanical edge 200. This inherently increases the accuracy of the method.

The invention has been described in detail with particular reference to certain preferred embodiments thereof, but it will be understood that variations and modifications can be effected within the scope of the invention.

PARTS LIST

| | |
|---|---|
| 10 | plate-making machine (platesetter) |
| 11 | third reference point on orthogonal edge |
| 11' | registration surface on orthogonal edge |
| 12 | drum |
| 13 | cylindrical surface |
| 14 | printing plate |
| 15 | reference edge of plate |
| 15' | reference edge of (skew) plate |
| 16 | imaging head |
| 17 | print image |
| 17A | edge of print image |
| 18A | registration pin |
| 18B | registration pin |
| 18C | registration pin |
| 18A' | registration surface of punching machine |
| 18B' | registration surface of punching machine |
| 19 | edge of plate orthogonal to 15 |
| 19' | edge of (skew) plate orthogonal to 15' |
| 20 | controller |
| 21 | reference point |
| 22 | memory |
| 23 | circumferential distance |
| 24 | direction parallel to the axis of drum |
| 25 | region adjacent to reference edge 15 |
| 26 | circumferential main-scan direction (forward or backward) |
| 27 | print image data |
| 28A | first of at least two reference points on reference edge |
| 28B | second of at least two reference points on reference edge |
| 40 | digital camera |
| 50 | punching machine |
| 52 | punch table |
| 60 | printing press |
| 62 | press cylinder |
| 100 | registering and imparting print image onto printing plate |
| 101 | carriage |
| 102 | mount plate |
| 103 | lead screw |
| 104 | locate points on registration edge |
| 105 | illumination source |
| 106 | determine required rotation (θ) |
| 108 | determine transformation |
| 110 | apply transformation |

-continued

| | |
|---|---|
| 112 | image plate |
| 120 | clamp |
| 130 | clamp |
| 140 | drum slot |
| 150 | diffusely reflective layer |
| 160 | illuminating light beam |
| 170 | illumination baffle |
| 180 | diffusely reflected light |
| 190 | imaging aperture |
| 200 | mechanical edge |
| 210a | non-reflective area |
| 210b | non-reflective area |
| 210c | non-reflective area |
| 220 | reflecting region |
| 230 | acute reflective apex |
| 240 | perpendicular projection |
| 250a | non-reflective area |
| 250b | non-reflective area |
| 250c | non-reflective area |
| 250d | non-reflective area |
| 250e | non-reflective area |
| 250f | non-reflective area |
| 260 | acute reflective apex |

The invention claimed is:

1. A method of imparting a print image on a printing plate, the method comprising: a) mounting the printing plate on an imaging drum in an orientation wherein a reference edge of the printing plate extends along the drum in a substantially axial direction; b) determining a location of at least one point on the reference edge, wherein the determining comprises: i) illuminating a region, the region comprising at least a part of the reference edge associated with each of the at least one point; ii) capturing at least one digital camera image of the region; and iii) locating the at least a part of the reference edge in the digital camera image; c) imparting the print image on the printing plate in alignment with at least the determined location of the at least one point; wherein the locating at least a part of the reference edge comprises locating a mechanical edge of the printing plate; wherein the illuminating is performed on the side of the printing plate that is in contact with the imaging drum; wherein the illuminating is by diffuse reflected light reflected from at least one diffusely reflective area on the imaging drum; wherein the illuminating is spatially interrupted by at least one non-reflective surface on the imaging drum; wherein the reference edge is positioned to extend over a slot in the imaging drum; the at least one non-reflective surface and the at least one diffusely reflective surface are on a radially recessed surface of the slot; and wherein the illuminating is spatially interrupted along an interrupting section of a part of the reference edge associated with the at least one point.

2. The method as in claim 1, wherein the at least one diffusely reflective area forms an acute reflective apex with the perpendicular projection of the reference edge onto the radially recessed surface of the slot.

3. The method as in claim 2, wherein:
 a) the printing plate is held to the drum by at least one clamp;
 b) the capturing of at least one digital camera image of the region is done through an imaging aperture in the at least one clamp; and
 c) the illuminating is done through an illumination baffle in the at least one clamp.

4. A method as in claim 1, wherein the locating the at least part of the reference edge comprises applying a correlation algorithm to distinguish an image of the at least a part of the reference edge from a prototype edge.

5. A method as in claim 4, wherein the applying the correlation algorithm comprises applying a Haar transform.

6. A method as in claim 4, wherein the applying the correlation algorithm comprises applying a coiflet transform.

7. A method of determining an alignment of a printing plate relative to an imaging drum on which the printing plate is mounted, the method comprising: a) determining a location of at least one point on a reference edge of the printing plate, wherein the reference edge extends along the imaging drum in a substantially axial direction; the determining a location comprising: i) illuminating a region, the region comprising at least a part of the reference edge associated with the at least one point; ii) capturing at least one digital camera image of the region with a digital camera; and iii) locating the at least a part of the reference edge in the digital camera image; b) determining the alignment of the printing plate at least in part from: i) the location of the at least a part of the reference edge in the digital camera image of the at least one point; and ii) a position of the digital camera relative to the imaging drum during the capturing of the at least one digital camera image of the at least one point; wherein the locating at least a part of the reference edge comprises locating a mechanical edge of the printing plate; wherein the illuminating is performed on the side of the printing plate that is in contact with the imaging drum; wherein the illuminating is by diffuse reflected light reflected from at least one diffusely reflective area on the imaging drum; wherein the illuminating is spatially interrupted by at least one non-reflective surface on the imaging drum; wherein: a) the reference edge is positioned to extend over a slot in the imaging drum; b) the at least one non-reflective surface and the at least one diffusely reflective surface are on a radially recessed surface of the slot; and wherein the illuminating is spatially interrupted along an interrupting section of a part of the reference edge associated with the at least one point.

8. The method as in claim 7, wherein the at least one diffusely reflective area forms an acute reflective apex with the perpendicular projection of the reference edge onto the radially recessed surface of the slot.

9. The method as in claim 8, wherein: a) the printing plate is held to the drum by at least one clamp; b) the imaging of the reference edge is done through an imaging aperture in the at least one clamp; and c) the illuminating is done through an illumination baffle in the at least one clamp.

10. A method as in claim 7, wherein the at least one point comprises at least two axially spaced apart points on the reference edge.

11. A method as in claim 7, wherein the digital camera is mounted on a carriage operable for moving in an axial direction relative to the imaging drum, the method further comprising determining the alignment of the printing plate from an axial position of the carriage.

12. A method for determining the location of a reference edge of a plate relative to a substrate on which the plate is mounted, the method comprising determining a location of at least one point on the reference edge, wherein the reference edge extends along a first direction on the substrate; the determining a location comprising: a) illuminating a region, the region comprising at least a part of the reference edge associated with the at least one point; b) capturing at least one digital camera image of the region with a digital camera; c) locating the at least a part of the edge in the digital camera image; d) determining the location of the at least one point from: i) a part of the reference edge in the digital camera image of the at least one point; ii) a position of the digital camera relative to the substrate during the capturing of the at least one digital camera image of the at least one point; wherein the locating at least a part of the reference edge comprises locating a mechanical edge of the printing plate; wherein the illuminating is performed on the side of the plate that is in contact with the substrate; wherein the illuminating is by diffuse reflected light reflected from at least one diffusely reflective area on the substrate; wherein the illuminating is spatially interrupted by at least one non-reflective surface on the substrate; and wherein: a) the reference edge is positioned to extend over a slot in the substrate, the slot extending in substantially the first direction; b) the at least one non-reflective surface and the at least one diffusely reflective surface are on a recessed surface of the slot; and wherein the illuminating is spatially interrupted along an interrupting section of a part of the reference edge associated with the at least one point.

13. The method as in claim 12, wherein the at least one diffusely reflective area forms an acute reflective apex with the perpendicular projection of the reference edge onto the recessed surface of the slot.

14. The method as in claim 12, wherein: a) the plate is held to the substrate by at least one clamp; b) the imaging of the reference edge is done through an imaging aperture in the at least one clamp; and c) the illuminating is done through an illumination baffle in the at least one clamp.

15. An apparatus as in claim 14, wherein the substrate is an imaging drum.

16. A method as in claim 12, wherein the at least one point comprises at least two spaced apart points on the reference edge.

17. A method as in claim 12, wherein the digital camera is mounted on a carriage operable for moving in the first direction relative to the surface, the method further comprising determining the location of the reference edge from a position of the carriage.

* * * * *